United States Patent [19]

Wusirika

[11] Patent Number: 4,778,671

[45] Date of Patent: Oct. 18, 1988

[54] PREPARATION OF UNAGGLOMERATED METAL OXIDE PARTICLES WITH UNIFORM PARTICLE SIZE

[75] Inventor: Raja R. Wusirika, Painted Post, N.Y.

[73] Assignee: Corning Glass Works, Corning, N.Y.

[21] Appl. No.: 884,973

[22] Filed: Jul. 14, 1986

[51] Int. Cl.$^4$ .............................................. C01G 25/02
[52] U.S. Cl. .................................... 423/592; 423/608; 423/598
[58] Field of Search ............... 423/592, 593, 598, 608, 423/263, 637, 639, 610, 604, 605, 606, 607

[56] References Cited

U.S. PATENT DOCUMENTS

| | | | |
|---|---|---|---|
| 2,964,413 | 12/1960 | Merker | 423/598 |
| 3,231,328 | 1/1966 | Pechini | 423/598 |
| 4,330,509 | 5/1982 | Henry | 423/608 |
| 4,619,817 | 10/1986 | Stambaugh et al. | 423/266 |
| 4,664,494 | 5/1987 | Suzuki et al. | 423/265 |

FOREIGN PATENT DOCUMENTS

| | | | |
|---|---|---|---|
| 1150961 | 6/1959 | Fed. Rep. of Germany | 423/608 |
| 0145118 | 11/1981 | Japan | 423/608 |
| 0036331 | 2/1985 | Japan | 423/608 |
| 0096528 | 5/1985 | Japan | 423/608 |
| 0176921 | 9/1985 | Japan | 423/608 |
| 255622 | 12/1985 | Japan | 423/608 |
| 1083627 | 4/1986 | Japan | 423/608 |
| 0709542 | 1/1980 | U.S.S.R. | 423/608 |

OTHER PUBLICATIONS

"Monodispersed Metal (Hydrous) Oxides-A Fascinating Field of Colloid Science", Egon Matijevic, Acc. Chem. Res. 1981, 14, 22–29.

Primary Examiner—Asok Pal
Attorney, Agent, or Firm—Joseph F. Posillico; Richard N. Wardell

[57] ABSTRACT

Disclosed is a method for producing substantially unagglomerated submicron metal oxide particles having uniform size distribution. The process is readily adaptable to the production of multicomponent metal oxide particles. The method comprises the steps of (1) providing a solution of a complex of an oxygen-containing metal salt and a chelating agent selected from the group consisting of ethylenediaminetetraacetic acid, hydroxy ethylenediaminetetraacetic acid, nitrilotriacetic acid, diethylenetriaminepentacetic acid, glycolic acid, lactic acid, citric acid, tartaric acid, succinic acid, alkali salts of the foregoing acids, and mixtures of these; (2) drying the solution by heating the solution under alkaline conditions for a time and at a temperature sufficient to remove substantially all the solvent from the solution and to leave a solid residue; (3) heating the solid residue for time and at a temperature sufficient to convert at least a substantial portion of the residue to substantially unagglomerated particles of the metal oxide having a mean diameter up to about one micron and a uniform particle size.

55 Claims, 9 Drawing Sheets

PREPARATION OF UNAGGLOMERATED METAL OXIDE PARTICLES WITH UNIFORM PARTICLE SIZE

BACKGROUND OF THE INVENTION

This invention relates to unagglomerated metal oxide particles and methods for their production. More particularly, this invention relates to methods for the production of metal oxide particles by drying and thermal decomposition of chelated solutions of oxygen containing metal salts.

The uses for metal oxide particles are numerous and varied, ranging from active ingredients in antiperspirants to ceramic raw materials. In a vast majority of these applications, the size, shape, and density of the particles which make up the powder are of critical importance. The effects of one aspect of particle morphology, the particle size distribution, on sintering behavior and the properties of the final ceramic articles are well known. For example, substantially unagglomerated metal oxide particles of a relatively uniform particle size tend to sinter at low temperatures, saving time and energy in the production of ceramic articles based thereon. In addition, particles of this type tend to pack into a highly dense green body with uniform pore structure during processing, thus leading to a highly-dense, pore-free sintered body with uniform microstructure. Uniform particle size is also helpful in the prevention of localized exaggerated grain growth which may cause flaws and thereby adversely affect strength and other desirable properties of ceramic articles.

In some applications, it is highly desirable to produce multicomponent metal oxide particles having the characteristics mentioned above. For example, many ceramic articles of zirconium oxide (zirconia) are stabilized when doped with a relatively small fraction of a second metal oxide. In particular, it is known that zirconia has three allotropes: monoclinic, tetragonal, and cubic. A transition between the monoclinic and the tetragonal phases occurs at about 1200° C. and involves a disruptive 4% change in volume. Because of this sharp volume change, "pure" or "unstabilized" zirconia is not generally useful for articles exposed to temperature fluctuations through the range at which the transformation occurs. It is known, however, that zirconia can be "wholly" or "partially" stabilized against this crystalline phase change by doping with such oxides as magnesium oxide, calcium oxide, and yttrium oxide. Such multiphase, stabilized materials, particularly the partially stabilized zirconias, have useful mechanical properties over a wide temperature range. It is important in making materials of this type that the stabilizing oxide be homogeneously dispersed throughout the ceramic article. Accordingly, a process for the production of multi-component metal oxide powders of homogeneous component distribution and in narrow particle-size ranges is highly desirable.

SUMMARY OF THE INVENTION

It is an object of the present invention to provide a method for producing substantially unagglomerated submicron metal oxide particles having uniform size distribution wherein said process is readily adaptable to the production of multicomponent metal oxide particles.

It is another object of the present invention to provide a method for producing metal oxide powders capable of sintering at lower temperatures because of their morphology.

It is a further object of the present invention to provide a method for producing high purity metal oxide particles.

These and other objects of the present invention are satisfied by a method in which precipitation of certain chelated solutes is precisely controlled. The method comprises the steps of (1) providing a solution of a complex of an oxygen-containing metal salt and a chelating agent selected from the group consisting of ethylenediaminetetraacetic acid (hereinafter EDTA), hydroxy ethylenediaminetetraacetic acid (hereinafter H-EDTA), nitrilotriacetic acid (hereinafter NTA), diethylenetriaminepentacetic acid (hereinafter DTPA), glycolic acid, lactic acid, succinic acid, citric acid, tartaric acid, alkali salts of the foregoing acids, and mixtures of these; (2) heating the solution under alkaline conditions for a time and at a temperature sufficient to remove substantially all the solvent from the solution and to leave a solid residue; and (3) heating the residue for a time and at a temperature sufficient to form substantially unagglomerated submicron particles of the oxide of said metal having a mean diameter of less than about 1 micron. It is believed that solutions according to the present invention which are dried as described above produce a controlled generation and precipitation of solutes which in turn produces unagglomerated particles of relatively uniform size.

Accordingly to a preferred practice of the present invention, the provided solution is a chelated solution selected from the group consisting of: (1) a solution of a chelated complex of an oxygen containing nitrate of a metal and a chelating agent selected from the group consisting of tartaric acid, citric acid, and mixtures of these; and (2) a solution of a chelated complex of an oxygen containing salt of a metal and a chelating agent selected from the group consisting of EDTA; H-EDTA; NTA; DTPA; glycolic acid; lactic acid; succinic acid; sodium, rubidium, or cesium salts of the foregoing acids; and mixtures of these.

Applicant believes an important feature of the present invention resides in heating the chelated solutions under alkaline conditions.

DETAILED DESCRIPTION OF THE INVENTION

Figure 1:
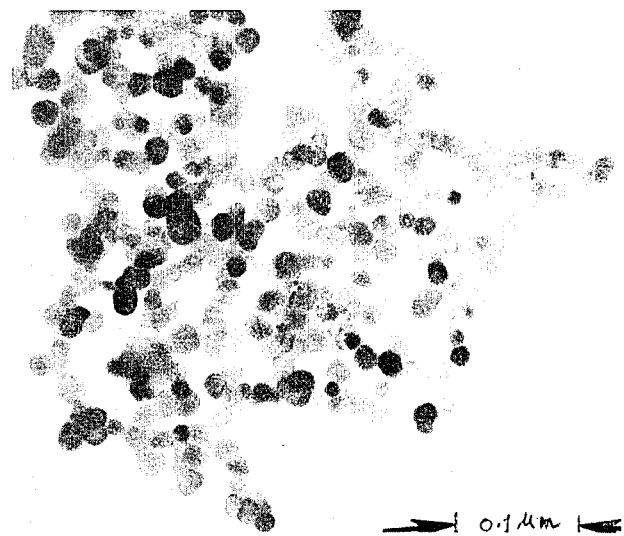
FIGS. 1–9 are scanning electron micrographs (SEM) of the particles described in the Examples.

An important feature of the present invention resides in the selection of the particular combination of solvents, oxygen-containing metal salts, and chelating agents which constitute the starting chelated solution of the present invention. The chelated solution is prepared by introducing into the solvent an oxygen-containing metal salt and a chelating agent capable of forming a complex with the metal. The chelating agent is added in an amount sufficient to complex with substantially all the metal present in the solvent.

The choice of solvent is not critical so long as it is capable of being readily volatilized in the drying step described below. Because of its ready availability and low cost, water is a preferred solvent, as are alcohols containing one to three carbon atoms.

The metal salts particularly useful in the practice of the invention are the oxygen-containing salts of metals whose oxides are useful in ceramic or refractory articles. Preferably the metal is zirconium and mixtures thereof with its stabilizing metals, notably calcium, magnesium, or yttrium. Preferably the salts are nitrates, carbonates, or oxychloride salts. In a preferred embodiment, the salt is a complex salt including an ammonium cation in addition to the metal itself. An example is ammonium zirconium carbonate (AZC).

Chelating agents selected from the group consisting of amine-containing acids, hydroxy carboxylic acids, dicarboxylic acids, alkali metal salts of the foregoing acids, and mixtures of these are generally adaptable for use according to the present invention. As the term is used herein, a chelating agent is a polydentate ligand capable of forming a complex with a metal ion. Accordingly, a chelated solution is a solution in which a metal ion is complexed with a chelating agent. Because of the stabilizing influence of the chelating agent upon metal ions in solution, the solubility of many metal salts is increased by the addition thereof. Accordingly, the addition of certain chelating agents to systems in which the metal salt is dispersed in the liquid solvent will produce a clear homogeneous solution.

According to a preferred embodiment, the chelating agents of the present invention are selected from the group consisting of EDTA, H-EDTA, NTA, DTPA, glycolic acid, lactic acid, succinic acid, tartaric acid, citric acid, alkali salts of the foregoing acids, and mixtures of these. While the foregoing chelating agents are generally adaptable for use with the oxygen-containing salts described above, as those skilled in the art will understand from this specification, not all combinations of the metal salts and chelating agents are compatible according to the present invention. On the other hand, there are several combinations of oxygen containing metal salts and chelating agents which appear to work exceptionally well in satisfying the objects of the present invention. All specific desirable and undesirable combinations will be discussed in further detail below.

In the further conduct of the present invention, the chelated solution is dried by heating it for a time and at a temperature sufficient to remove substantially all of the solvent from the solution, leaving a solid residue of precipitated chelate complex. It will be appreciated by those skilled in the art that the time and temperature required will depend in any particular case upon the particular solvent, metal salt, and chelating agent used, and the concentrations of each. When water is used as solvent, it is preferred that the heating step of the present invention be conducted at a temperature of less than about 100° C. in order to avoid boiling of the solution. It is also preferred that the temperature be above about 50° C. in order to minimize the time for the drying step. It is anticipated that most chelated solutions having water as a solvent will have a drying time that ranges between about 4 hrs. and 2 days.

It is especially preferred that drying of the solution be conducted under alkaline conditions, by which it is meant that the solution remains basic throughout a substantial portion of the drying step. In the context of aqueous solutions, the pH of the solution should remain above about 7, and most preferably above about 9, during a substantial portion the drying step. While applicant does not wish to be bound by or to any particular theory, it is believed that the maintenance of alkaline conditions during the drying step produces controlled precipitation and nucleation of the solute by providing a strongly chelated solution up until the point of precipitation. Since chelate ring formation is characterized by multiple coordinate bonding between the electron pair donor groups of the multidentate ligand and the electron acceptor pair metal ion, maintaining alkaline conditions in the solution encourages stable chelation of the metal ion. Accordingly, it is preferred that the starting chelated solution be basic in nature and remain so upon drying, in which case the drying step inherently would be conducted under essentially alkaline conditions. In particular, applicant believes that the use of certain alkali salts to chelate the metal ion will produce solutions which are basic in nature and remain so upon drying. It will be understood by those skilled in the art, however, that other means are available and well known for heating solutions under alkaline conditions. For example, it is contemplated that a strong base can be added to the solution prior to or during the drying process to maintain and/or increase its alkalinity during the drying step.

According to the final step of the present invention, the precipitated solid residue is calcined for a time and at a temperature sufficient to generate the metal oxide itself from the chelate complex and to burn off the organic materials. During calcination substantially unagglomerated metal oxide particles having a mean diameter of up to about 1 micron are generated. As the term is used herein, substantially unagglomerated metal oxide particles are individual primary particles which contain at least a measurable portion of the metal oxide therein, and which are essentially free from strong inter-particle contact and/or forces. In contrast, agglomerated metal oxide particles are primary particles which have joined or fused together to form large chunks of metal oxide material. In addition, the metal oxide particles formed according to the methods of the present invention generally have a very uniform size distribution. As the term is used herein, particles having a uniform size distribution are particles in which the standard deviation of the particle sizes in a representative sample of the particles is within plus or minus about 30% of the mean (number) particle size. As a point of contrast, a collection of particles having a bimodal particle distribution is one in which a significant number of particles are of a size an order of magnitude removed from the mean particle size. Particle size can be determined by scanning or transmission electron microscopy, through which the particle size itself and other particle characteristics can be observed. Accordingly, the present invention provides a method for producing substantially unagglomerated metal oxide particles having a mean diameter of less than about 1 micron and a uniform particle size distribution.

The present invention is believed to be capable of producing metal oxides of most metals. The method is particularly well adapted for the production of oxides of alkaline earth metals, lanthanide metals, and metals in Group IVb of the periodic table. In addition, oxides of transition metals, i.e., metals is Groups IIIb through IIb, can generally be produced according to the present invention. Applicant believes, however, that the following metal oxides are not particularly well adapted for production according to the present invention: vanadium, tin, tungsten, molybdenum, niobium, and tantalum. The above references to the periodic table should be interpreted according to the presentation of the periodic table on page B-4 of the 57th edition of the CRC "Handbook of Chemistry and Physics".

In order to demonstrate production of metal oxide particles according to the present invention, several experiments were performed. These experiments are the basis for the examples which follow, which are intended to be illustrative, but not limiting, of the present invention.

EXAMPLES 1

Zirconium Oxide Particles from Ammonium Zirconium Carbonate Solute And Disodium Salt of EDTA As Chelating Agent Ammonium zirconium carbonate (AZC) having the formula $(NH_4)_2[Zr(OH)_2(CO_3)_2]$ was dissolved in water in an amount sufficient to produce a 0.2 molar solution. With the solution at between about 50°–80° C., disodium salt of EDTA was added to the solution in an amount sufficient to produce a one to one molar ratio between disodium salt of EDTA and the AZC. Disodium salt of EDTA was prepared by reacting reagent grade EDTA obtained from Baker Chemical Co. with sodium carbonate. The resulting chelated solution was strongly alkaline. The chelated solution was then heated to a temperature of about 100° C. and maintained at that temperature for approximately 2 days to produce a solid residue in the form of white flakes or powder. Upon testing, the white flakes were found to be readily soluble in water. The flakes were then calcined at 600° C. for 6 hours to produce metal oxide particles having $Na_2CO_3$ as an impurity mixed therewith. The $Na_2CO_3$ was then removed by washing with distilled water to obtain ZrO containing an impurity of about 0.3 mole % $Na_2O$. The resultant metal oxide powder was comprised of metal oxide particles having a mean diameter of approximately 250 angstroms and a uniform size distribution. The particles were generally spherical and substantially unagglomerated as shown by the SEM in FIG. 1.

EXAMPLE 1A

Figure 2:
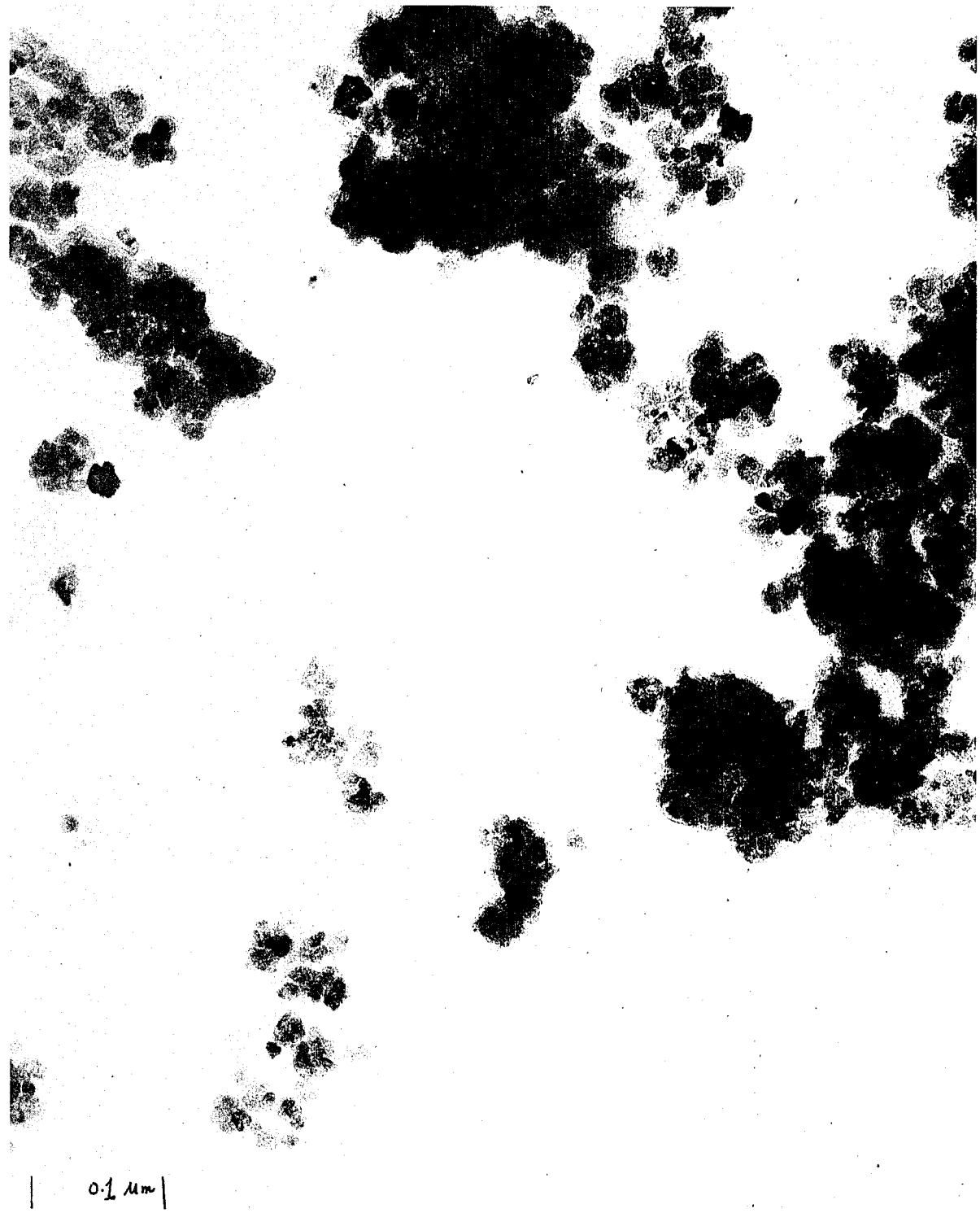

Zirconium Oxide Particles from Ammonium Zirconium Carbonate Solute without a Chelating Agent The procedure of Example 1 was repeated except that the disodium salt of EDTA was not added to the solution. The resulting solution was alkaline. Drying of the solution produced a gel. Calcination of the gel produced highly agglomerated particles having a mean diameter of about 300 angstroms as shown by the SEM in FIG. 2.

It is clear from a comparison of Examples 1 and 1A that the addition of a chelating agent to the solution to form a chelated solution is an important aspect of the present invention which is required in order to achieve the objects of the present invention.

EXAMPLE 2

Figure 3:

Zirconium Oxide Particles from Ammonium Zirconium Carbonate Solute And EDTA Chelating Agent The procedure of Example 1 was repeated except that the disodium salt of EDTA was replaced by EDTA on a one to one molar basis. The resulting chelated solution was not strongly alkaline. The resulting calcined particles were highly agglomerated and formed chunks of metal oxide having wide size distributions, as seen by the SEM in FIG. 3.

This example indicates that the use of EDTA to complex ammonium zirconium carbonate according to the present invention does not fully satisfy the objects of the present invention. In comparison to the chelated solution of Example 1, the chelated solution of Example 2 is relatively weakly alkaline and does not contain alkali metal ions. Although applicant does not wish to be bound by or to any theory, it is believed that these two factors contributed to the failure to produce unagglomerated metal oxide particles in the process of this example. As mentioned previously, it is believed that weakly alkaline conditions do not promote the controlled precipitation and nucleation of the solute. In addition, applicant believes that the presence of sodium ions in solution during the drying step and the calcining step as per Example 1 is very beneficial to the process of the present invention. Applicant believes hhat the participation of the sodium ions in the process of the present invention can be summarized as follows:

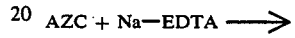

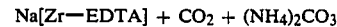

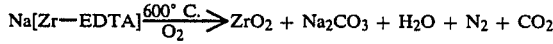

In addition, it is believed that the use of alkali metal salts in general and sodium salts in particular provides a chelated solution which is strongly alkaline and which maintains its alkalinity throughout a substantial portion of the drying process. Accordingly, the failure of the process according to the present example to produce particles in accordance with the objects of the present invention may be attributed in large part to weak alkalinity of the chelated solution and what is believed to be a resultant failure to carry out the drying step under alkaline conditions.

EXAMPLE 3

Zirconium Oxide Particles from Ammonium Zirconium Carbonate Solute And Disodium Salt of EDTA as Chelating Agent in Various Proportions The procedure of Example 1 was repeated except that the molar ratio of disodium salt of EDTA to ammonium zirconium carbonate was varied from 0.01 to 1.0. These experiments indicate that there is a correlation between the extent of chelation, which in the present example increases with increasing molar ratio, and the formation of unagglomerated particles having a uniform size distribution, as indicated by Table 1 below and the figures referred to therein.

TABLE 1

Figure 4:
Figure 5:
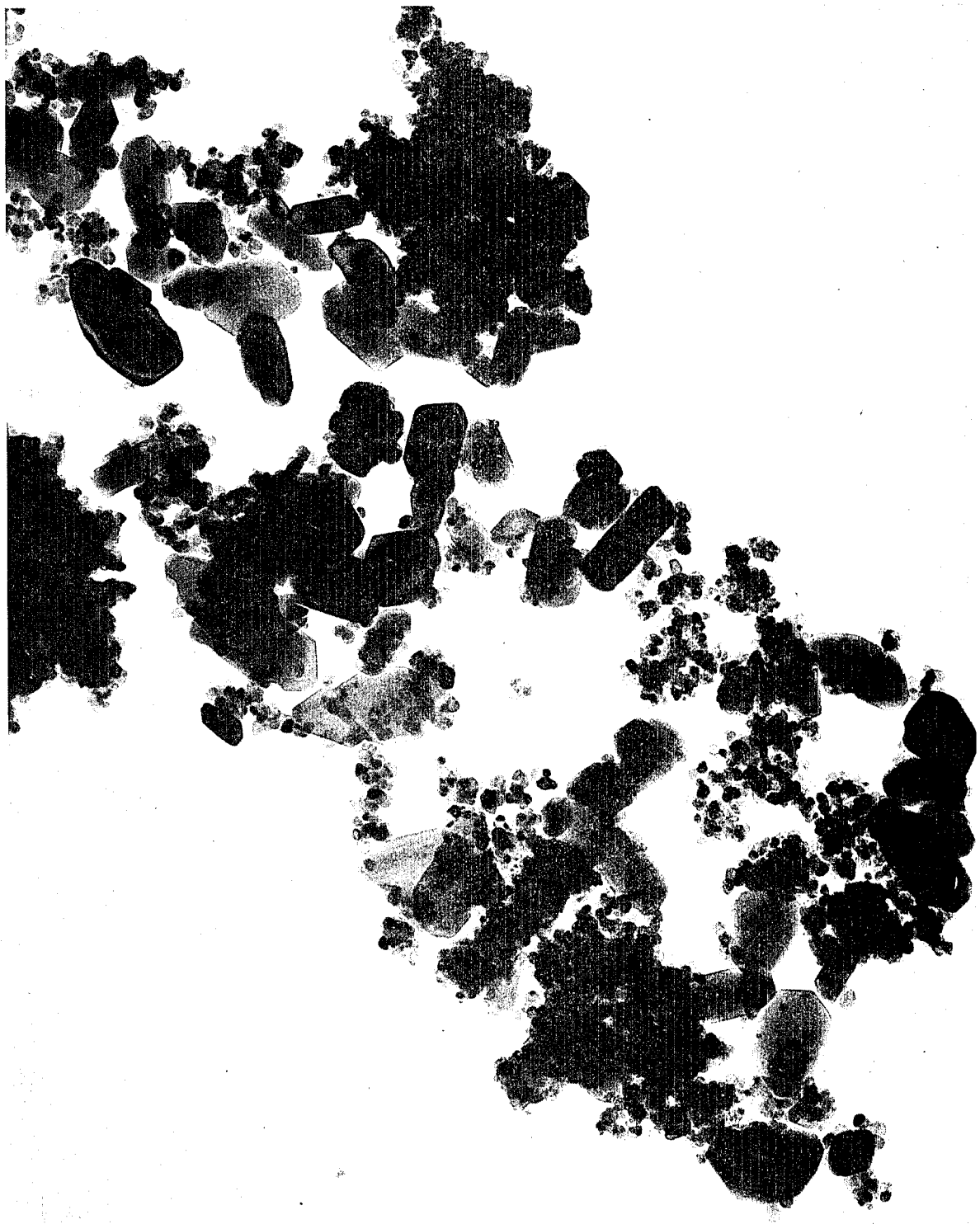
Figure 6:

| Molar Ratio | Particle Quality |
| --- | --- |
| 0.01 | Highly Agglomerated (see FIG. 4) |
| 0.1 | Substantially Agglomerated (see FIG. 5) |
| 0.5 | Substantially Unagglomerated (see FIG. 6) |
| 1.0 | Highly Unagglomerated (see FIG. 1) |

EXAMPLE 4

Zirconium Oxide Particles from Ammonium Zirconium Carbonate Solute And Various Alkali Salts of EDTA as Chelating Agent The procedure of Example 1 was repeated several times using different alkali salts of EDTA in place of the disodium salt of EDTA each time. The results of these experiments in terms of resultant particle morphology is summarized in Table 2 below.

TABLE 2

| Alkali Salt | Particle Quality |
| --- | --- |
| Mg—EDTA | Highly Agglomerated |
| Ca—EDTA | Highly Agglomerated |
| Li—EDTA | Highly Agglomerated |
| K—EDTA | Highly Agglomerated |
| Rb—EDTA | Somewhat Unagglomerated |
| Cs—EDTA | Somewhat Unagglomerated |

It would appear from the above results that rubidium and cesium salts of EDTA are generally applicable as chelating agents according to the present invention, at least when used with ammonium zirconium carbonate as solute. For reasons which are yet unclear, however, it would appear that magnesium, calcium, lithium and potassium salts of EDTA do not produce particles in accordance with the objects of the present invention.

EXAMPLE 5

Zirconium Oxide Particles from Ammonium Zirconium Carbonate Solute And Ammonium Salt of EDTA as Chelating Agent The procedure of Example 1 was repeated except that the disodium salt of EDTA was replaced by ammonium salt of EDTA on a 1 to 1 molar basis. The resulting chelated solution was not strongly alkaline. The resulting calcined particles were highly agglomerated chunks of metal oxide having a wide size distribution. This example indicates that the use of ammonium salt of EDTA to complex ammonium zirconium carbonate according to the present invention does not fully satisfy the objects of the present invention. It is believed that the absence of alkali metal ions in the chelated solution of this example is, in part, responsible for the poor results.

A experiment similar to Example 5 was carried out using urea in combination with EDTA as the chelating agent. Results similar to those obtained with the use of ammonium EDTA salts were observed.

EXAMPLE 6

Zirconium Oxide Particles from Ammonium Zirconium Carbonate Solute and Disodium Salt of Various Amine Containing Acids as Chelating Agents The procedure of Example 1 was repeated several times, except that each time the disodium salt of EDTA was replaced by the disodium salt of a different amine containing acid. The particular chelating agent used and the characteristics of the particles produced thereby are summarized below in Table 3.

TABLE 3

| Chelating Agent | Particle Quality | Approximate Particle Size, Angstroms |
| --- | --- | --- |
| Na$_2$—NTA | Highly Unagglomerated | 130 |
| Na$_2$—HEDTA | Highly Unagglomerated | 250 |
| Na$_2$—DTPA | Somewhat Unagglomerated | 650 |

Analysis of this example indicates that the use of disodium salts of amine containing acids to complex ammonium zirconium carbonate according to the present invention satisfies the objects of the present invention.

EXAMPLE 7

Figure 7:

Zirconium Oxide Particles From Ammonium Zirconium Carbonate Solute and Sodium Salt of Glycolic Acid as Chelating Agent The procedure of Example 1 was repeated except that the disodium salt of EDTA was replaced by the sodium salt of glycolic acid, i.e. sodium glycolate, in an amount sufficient to produce a three to one molar ratio between sodium glycolate and the AZC. The resultant chelated solution was alkaline. The resultant metal oxide powder was comprised of metal oxide particles having a mean diameter of approximately 140 angstroms and a uniform size distribution. The particles were generally spherical and substantially unagglomerated as shown by the SEM in FIG. 7.

An experiment similar to Example 7 has carried out using sodium salt of lactic acid in place of sodium salt of glycolic acid. Similar results were obtained.

EXAMPLE 8

Figure 8:
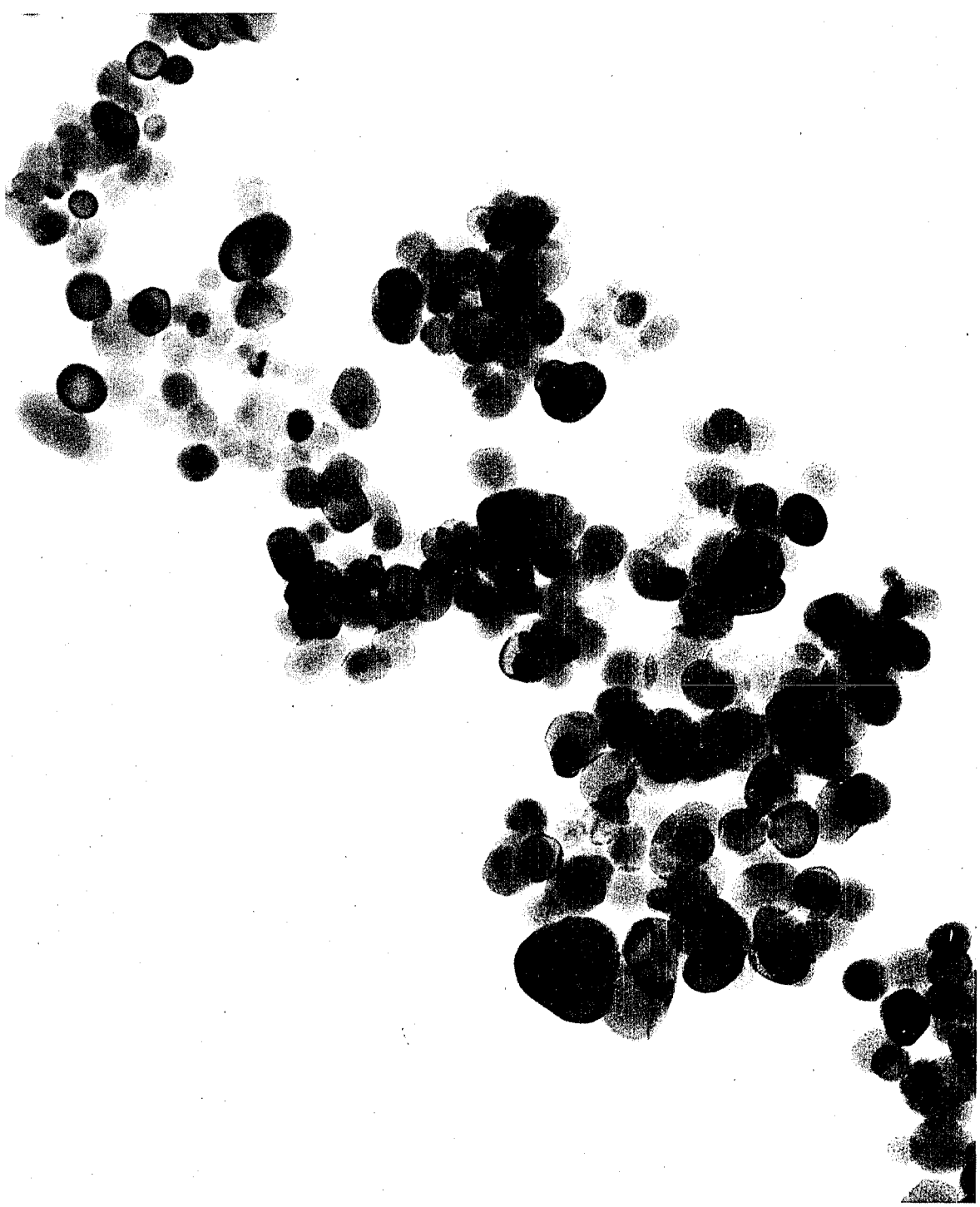

Metal Oxide Particles From Zirconium Oxy Chloride Solute and Sodium Salt of Glycolic Acid as Chelating Agent The procedure of Example 7 was repeated except that zirconium oxychloride having the formula ZrOCl$_2$.8H$_2$O was provided as the solute in place of the AZC. The resultant chelated solution was alkaline. The resultant metal oxide powder was comprised of metal oxide particles having a mean diameter of approximately 400 angstroms and a uniform size distribution. The particles were generally spherical and substantially unagglomerated as shown by the SEM in FIG. 8.

EXAMPLE 9

Figure 9:

Zirconium Oxide Particles From Zirconium Basic Carbonate Solute and Sodium Salt of Glycolic Acid as Chelating Agent The procedure of Example 8 was repeated except that zirconium oxychloride was replaced by zirconium basic carbonate. The resultant chelated solution was not strongly alkaline. The resultant metal oxide powder was comprised of metal oxide particles having an undesirable bimodal particle distribution as revealed by the SEM of FIG. 9. It is not yet fully understood why zirconium basic carbonate solute does not satisfy the objects of the present invention when used in combination with sodium glycolate as chelating agent.

EXAMPLE 10

Zirconium Oxide Particles From Ammonium Zirconium Carbonate Solute and Various Hydroxy Carboxylic Acids as Chelating Agent The procedure of Example 7 was repeated except that the sodium salt of glycolic acid was replaced by glycolic acid in one experiment and by lactic acid in another experiment. In neither experiment was the chelated solution strongly alkaline. The results of these experiments in terms of particle morphology are summarized in Table 5 below.

TABLE 5

| Hydroxy Carboxylic Acid | Particle Quality | Approximate Particle Size, Angstroms |
| --- | --- | --- |
| Glycolic Acid | Agglomerated | 100–150 |

TABLE 5-continued

| Hydroxy Carboxylic Acid | Particle Quality | Approximate Particle Size, Angstroms |
| --- | --- | --- |
| Lactic Acid | Agglomerated | 100–150 |

A comparison of this example with examples 7, 8, and 9 above indicates that the use of alkali salts of the hydroxy carboxylic acids produces more favorable results than the use of the acids themselves as chelating agents. Once again, it is believed that the relatively low alkalinity and the absence of alkali metal ions in the chelated solutions of this example contributed to failure to produce unagglomerated metal oxide particles. In particular, applicant believes that the drying step was not carried out under strongly alkaline conditions.

EXAMPLE 11

Zirconium Oxide Particles From Ammonium Zirconium Carbonate Solute And With Various Aliphatic Dicarboxylic Acids as Chelating Agent The procedure of Example 1 was repeated several times, except that each time the disodium salt of EDTA was replaced by a different aliphatic dicarboxylic acid. In Table 4 that follows, the listed dicarboxylic acid was added to the solution in an amount sufficient to produce a 2 to 1 molar ratio of acid to AZC.

TABLE 4

| Dicarboxylic Acid | Particle Quality | Approximate Particle Size, Angstroms |
| --- | --- | --- |
| Oxalic Acid | Agglomerated | 500–800 |
| Malonic Acid | Agglomerated | 100–200 |
| Succinic Acid | UnAgglomerated | 100–200 |

It is clear from an analysis of Example 11 that the use of succinic acid in combination with ammonium zirconium carbonate provides an effective solution according to this invention. While no actual experiment has been carried out, applicant believes that the substitution of an alkali salt of succinic acid for the succinic acid used in Example 11 would also satisfy the objects of the present invention. This belief is based upon an analysis of Examples 2 and 3, and 7 and 10. In each of these cases the substitution of sodium salt for the acid itself produced significantly improved results. It is expected, therefore, that substitution of an alkali salt, in particular a sodium salt, of succinic acid for the succinic acid itself would produce improved results.

EXAMPLE 12

Zirconium Oxide Particles From Ammonium Zirconium Carbonate Solute and Disodium Salt of Phthallic Acid as Chelating Agent The procedure of Example 1 was repeated except that the disodium salt of EDTA was replaced by disodium salt of phtallic acid in an amount sufficient to produce a two to one molar ratio of disodium salt to AZC. The resultant metal oxide powder was comprised of metal oxide particles having a mean diameter of approximately 100 angstroms and a relatively uniform size distribution, although some large particles were apparent. It is believed that the large particles may have resulted from incomplete chelation of the ammonium zirconium carbonate solution. This is so because the exact amount of the disodium salt of phthallic acid which is needed to complex zirconium is not well established and it may be that more than two moles of chelating agent are required per mole of zirconium.

EXAMPLE 13

Zirconium Oxide Particles From Zirconyl Nitrate Solute and Citric Acid as Chelating Agent One mole of zirconyl nitrate having the formula $ZrO[NO_3]_2 \cdot 6H_2O$ was dissolved in hot methanol while stirring in an amount sufficient to produce a 0.2 molar solution. With continuous stirring and the solution at 50° C., citric acid was added to the solution in an amount sufficient to produce a one to one molar ratio between the zirconyl nitrate and the citric acid. With continuous stirring, about 2 moles of ammonium hydroxide were slowly added until a clear chelated solution was attained. The chelated solution was then heated to a temperature of about 100° C. and maintained at that temperature for approximately 1 day to evaporate the methanol and form a dried cake or powder. The cake or powder was then calcined at 600° C. for about 6 to 24 hours. The material foamed during the calcination process. The resultant metal oxide powder was comprised of metal oxide particles having a mean diameter of approximately 200 angstroms. The particles were generally spherical and substantially unagglomerated.

It is believed that the solvent used in this experiment, i.e., methanol, can be effectively replaced with other alcohols, such as ethanol or propanol. It is also believed that ammonium hydroxide can be effectively replaced with other bases, such as urea.

EXAMPLE 14

Zirconium Oxide Particles From Zirconyl Nitrate Solute and Glycolic Acid as Chelating Agent The procedure of Example 13 was repeated except that citric acid was replaced by glycolic acid so as to produce a 3 to 1 molar ratio of glycolic acid to zirconyl nitrate. The resultant metal oxide powder was comprised of highly agglomerated metal oxide particles. It is not yet fully understood why zirconyl nitrate solute does not satisfy the objects of the present invention when used in combination with glycolic acid as chelating agent.

EXAMPLE 15

Zirconium Oxide Particles From Zirconyl Chloride Solute and Citric Acid as Chelating Agent The procedure of Example 13 was repeated except that zirconyl nitrate was replaced by zirconyl chloride on a 1 to 1 molar basis. The resultant metal oxide powder was comprised of metal oxide particles which were highly agglomerated. It is not yet fully understood why zirconyl chloride solute does not satisfy the objects of the present invention when used in combination with citric acid as chelating agent.

EXAMPLE 16

Partially Stabilized Zirconium Oxide

A chelated solution of yttrium acetate, ammonium zirconium carbonate, and disodium EDTA in a molar ratio of 0.12 to 0.88 to 1 was provided. This chelated solution was dried and calcined as in Example 1. The resulting calcined particles were substantially unagglomerated and had a mean particle size of about 100 angstroms. The crystal structure of the particles was cubic zirconium oxide partially doped with about 6 mole percent $Y_2O_3$.

The chelated solution of magnesium acetate, ammonium zirconium carbonate, disodium EDTA in a molar ratio of 0.08 to 0.92 to 1 was provided. This chelated solution was dried and calcined as in Example 1. The resulting calcined particles were substantially unagglomerated and had a mean particle size of about 100 angstroms. The crystal structure of the particles was tetragonal zirconium oxide partially doped with about 8 mole percent magnesium oxide.

A chelated solution of magnesium nitrate, zirconium nitrate, an disodium EDTA in a molar ratio of 0.08 to 0.92 to 1 was provided. This chelated solution was dried, and calcined as in Example 1. The resulting calcined particles were substantially unagglomerated and had a mean particle size of about 100 angstroms. The crystal structure of the particles was tetragonal partially doped with about 8 mole percent magnesium oxide.

As can be seen from a comparison of the results disclosed in Example 16, a variation of the dopant precursor from one metal to another metal and from one salt to another salt has very little impact on the resultant particle morphology. This comparison also indicates that variation of the metal oxide salt from AZC to zirconium nitrate had little impact upon the morphology of the resulting particles.

What is claimed is:

1. A process for the production of substantially unagglomerated metal oxide particles having a mean diameter of up to about 1 micron and a substantially uniform particle size comprising:
   (a) providing a solution of an oxygen-containing nitrate of a first metal selected from the group consisting of alkaline earth metals, lanthanide metals, transition metals exclusive of vanadium, tungsten, molybdenum, niobium and tantalum, and mixtures of these;
   (b) adding to the solution a chelating agent selected from the group consisting of tartaric acid, citric acid, and mixtures of these;
   (c) adding to the solution a base selected from the group consisting of ammonium hydroxide, urea, and mixtures of these;
   (d) drying the solution by heating for a time and at a temperature sufficient to remove substantially all the solvent from the solution to leave a solid residue; and
   (e) calcining the solid residue for a time and at a temperature sufficient to form particles of said metal oxide.

2. The process of claim 1 wherein said first metal is selected from the group consisting of alkaline earth metals, lanthanide metals, metals from Group IVb of the periodic table, and mixtures of these.

3. The process of claim 1 wherein the solution has a solvent selected from the group consisting of $C_1$-$C_3$ alcohols.

4. The process of claim 3 wherein said chelating agent is citric acid.

5. The process of claim 4 wherein said first metal is zirconium.

6. The process of claim 5 wherein said nitrate is zirconyl nitrate.

7. The process of claim 6 wherein the citric acid is added in an amount sufficient to produce a molar ratio of citric acid to zirconyl nitrate of at least about 0.5 to 1.

8. The process of claim 5 wherein said base is ammonium hydroxide.

9. The process of claim 5 further comprising the step of adding to the solution of step (a), (b) and/or (c) an oxygen containing salt of a second metal.

10. The process of claim 9 wherein said second metal salt is added in an amount sufficient to produce a second metal oxide in an amount up to about 10 mole percent of the oxide of the first metal.

11. The process of claim 10 wherein said second metal is selected from the group consisting of yttrium, magnesium and calcium.

12. A process for the production of substantially unagglomerated metal oxide particles having a mean diameter of up to about 1 micron and a substantially uniform particle size comprising:
   (a) providing an alkaline solution of a salt of a first metal having an ammonium cation and a carbonate anion, said first metal being selected from the group consisting of alkaline earth metals, lanthanide metals, transition metals exclusive of vanadium, tungsten, molybdenum, niobium and tantalum, and mixtures of these;
   (b) adding a chelating agent to the solution to form a chelated solution, said chelating agent being a sodium salt of an acid selected from the group consisting of EDTA, H-EDTA, NTA, DTPA, lactic acid, glycolic acid, succinic acid, and mixtures of these;
   (c) drying the chelated solution by heating for a time and at a temperature sufficient to remove substantially all the solvent from the solution to leave a solid residue; and
   (d) heating the solid residue for a time and at a temperature sufficient to convert at least a substantial portion of the residue to said metal oxide.

13. The process of claim 12 wherein said first metal is selected from the group consisting of alkaline earth metals, lanthanide metals, metals from Group IVb of the periodic table, and mixtures of these.

14. The process of claim 13 wherein said chelating agent is a sodium salt of EDTA.

15. The process of claim 14 wherein said metal is zirconium.

16. The process of claim 14 wherein said salt is ammonium zirconium carbonate.

17. The process of claim 16 wherein the sodium salt of EDTA is added in an amount sufficient to produce a molar ratio of sodium salt to ammonium zirconium carbonate of at least about 0.5 to 1.

18. The process of claim 15 further comprising the step of adding to the solution of step (a), (b) and/or (c) an oxygen containing salt of a second metal.

19. The process of claim 18 wherein said second metal salt is added in an amount sufficient to produce a second metal oxide in an amount up to about 10 mole percent of the oxide of the first metal.

20. The process of claim 19 wherein said second metal is selected from the group consisting of yttrium, magnesium and calcium.

21. A process for the production of substantially unagglomerated metal oxide particles having a mean diameter of up to about 1 micron and a substantially uniform particle size distribution comprising:
   (a) providing a solution of a chelated complex of a salt of a first metal having an ammonium cation and a carbonate anion and a chelating agent, said chelating agent being a rubidium cesium, or sodium salt of an acid selected from the group consisting of EDTA, H-EDTA, NTA, DTPA, glycolic acid, succinic acid, lactic acid, and mixtures of these, said first metal being selected from the group consisting of alkaline earth metals, lanthanide metals, transition metals exclusive of vanadium, tungsten, molybdenum, niobium and tantalum, and mixtures of these;

(b) heating the solution under alkaline conditions for a time and at a temperature sufficient to remove substantially all of the solvent from the solution to leave a solid residue; and (c) heating the solid residue for a time and at a temperature sufficient to form particles of said metal oxide.

22. The process of claim 21 wherein said first metal is selected from the group consisting of alkaline earth metals, lanthanide metals, metals from Group IVb of the periodic table, and mixtures of these.

23. The process of claim 22 wherein said chelating agent is a sodium salt.

24. The process of claim 23 wherein said chelating agent is a disodium salt.

25. The process of claim 24 wherein said provided solution is an alkaline solution.

26. The process of claim 25 wherein said first metal is a metal from Group IVb of the periodic table.

27. The process of claim 26 wherein said first metal is zirconium.

28. The process of claim 21 wherein the step of heating the solution under alkaline conditions further comprises the step of adding a base to the solution to produce alkaline conditions.

29. The process of claim 28 wherein said heating is carried out for between about 4 hours and 2 days at a temperature of between about 50° C. and 100° C.

30. The process of claim 28 wherein the solvent of said solution is water.

31. The process of claim 21 wherein said first metal is zirconium.

32. The process of claim 31 wherein said provided solution contains an oxygen containing salt of a second metal.

33. The process of claim 32 wherein said second metal salt is present in an amount sufficient to produce a second metal oxide in an amount up to about 10 mole percent of the oxide of the first metal.

34. The process of claim 33 wherein said second metal is selected from the group consisting of yttrium, magnesium, and calcium.

35. A process for the production of substantially unagglomerated metal oxide particles having a substantially uniform particle size distribution and a mean diamerter of less than about 1 micron comprising;

(a) providing a chelated solution selected from the group consisting of:

(1) a solution of a chelated complex of an oxygen containing nitrate of a first metal selected from the group consisting of alkaline earth metals, lanthanide metals, transition metals exclusive of vanadium, tungsten, molybdenum, niobium and tantalum, and chelating agent selected from the group consisting of tartaric acid, citric acid, and mixtures of these; and (2) a solution of a chelated complex of an oxygen-containing salt of a first metal selected from the group consisting of alkaline earth metals, lanthanide metals, transition metals exclusive of vanadium, tungsten, molybdenum, niobium and tantalum, and a chelating agent selected from the group consisting of: EDTA; H-EDTA; NTA; DTPA; lactic acid; succinic acid; sodium, rubidium, or cesium salts of the foreging acids; and a mixture of these;

(b) heating the chelated solution under alkaline conditions, said heating step carried out for a time and at a temperature sufficient to remove substantially all the solvent from the solution to leave a solid residue; and (c) heating the solid residue for a time and at a temperature sufficient to form particles of said metal oxide.

36. The process of claim 35 wherein said chelated solution is a solution of a chelated complex of an oxygen-containing nitrate of a metal and a chelating agent selected from the group consisting of tartaric acid, citric acid, and mixtures of these.

37. The process of claim 36 wherein said metal is selected from the group consisting of alkaline earth metals, lanthanide metals, and metals in Group IVb of the periodic table.

38. The process of claim 37 wherein said metal is zirconium.

39. The process of claim 38 wherein the solution has a solvent selected from the group consisting of $C_1$ to $C_3$ alcohols.

40. The process of claim 35 wherein said chelated solution is a solution of a chelated complex of a salt of a metal having an ammonium cation and a carbonate anion and a chelating agent selected from the group consisting of EDTA; H-EDTA; NTA; DTPA; glycolic acid; lactic acid; succinic acid; and sodium, rubidium or cesium salts of the foregoing acids.

41. The process of claim 40 wherein said chelated solution is a solution of a chelated complex of a salt of a metal having an ammonium cation and a carbonate anion, and a chelating agent consisting of succinic acid.

42. The process of claim 41 wherein said metal is selected from the group consisting of alkaline earth metals, a lanthanide metals, and metals in group IVb.

43. The process of claim 42 wherein said metal is zirconium.

44. The process of claim 35 wherein said chelated solution is a solution of a chelated complex of an oxygen containing chloride of a metal and a chelating agent consisting of a sodium salt of glycolic acid.

45. The process of claim 44 wherein said first metal is selected from the group consisting of alkaline earth metals, lanthanide metals, and metals in Group IVb of the periodic table.

46. The process of claim 44 wherein said metal is zirconium.

47. The process of claim 35 further comprising the step of adding to the solution of step (a), (b) and/or (c) an oxygen containing salt of a second metal.

48. The process of claim 47 wherein said second metal is added in an amount sufficient to produce a second metal oxide in an amount up to about 10 mole percent of the oxide of the first metal.

49. The process of claim 48 wherein said second metal is selected from the group consisting of yttrium, magnesium and calcium.

50. A process of the production of substantially unagglomerated metal oxide particles having a substantial uniform particle size distribution and a mean diameter of less than about 1 micron comprising:

(a) providing a solution of chelated complex of an oxygen containing salt of a metal selected from the group consisting of alkaline earth metals, lanthanide metals, transition metals exclusive of vanadium, tungsten, molybdenum, niobium and tantalum, and a chelating agent selected from the group consisting of: EDTA; H-EDTA; NTA; DTPA; glycolic acid; lactic acid; succinic acid; tartaric acid; citric acid; phthalic acid; alkali salts of the foregoing acids; and mixtures of these;

(b) heating the chelated solution under alkaline conditions, said heating step carried out for a time and at a temperature sufficient to remove substantially all the solvent from the solution to leave a solid residue; and (c) heating the solid residue for a time and at a temperature sufficient to convert at least a substantial portion of the residue to said metal oxide.

51. The process of claim 50 wherein metal is selected from the group consisting of alkaline earth metals, lanthanide metals, and metals in group IVb of the periodic table.

52. The process of claim 51 wherein said metal is zirconium.

53. The process of claim 50 further comprising the step of adding to the solution an oxygen containing salt of a second metal.

54. The process of claim 53 wherein said second metal salt is added in an amount sufficient to produce a second metal oxide in an amount up to about 10 mole percent of the oxide of the first metal.

55. The process of claim 54 wherein said second metal is selected from the group consisting of yttrium, magnesium and calcium.

* * * * *